(12) United States Patent
La Commara

(10) Patent No.: US 10,287,003 B2
(45) Date of Patent: May 14, 2019

(54) AIRCRAFT LANDING GEAR WITH ORIENTABLE LOWER PART

(71) Applicant: MESSIER-BUGATTI-DOWTY, Velizy Villacoublay (FR)

(72) Inventor: Domenico La Commara, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 15/109,955

(22) PCT Filed: Jan. 6, 2015

(86) PCT No.: PCT/EP2015/050113
§ 371 (c)(1),
(2) Date: Jul. 6, 2016

(87) PCT Pub. No.: WO2015/106991
PCT Pub. Date: Jul. 23, 2015

(65) Prior Publication Data
US 2016/0332725 A1    Nov. 17, 2016

(30) Foreign Application Priority Data

Jan. 14, 2014  (FR) ...................... 14 50283

(51) Int. Cl.
*B64C 25/50* (2006.01)
*F15B 15/06* (2006.01)
*B64C 25/34* (2006.01)
*F15B 15/14* (2006.01)

(52) U.S. Cl.
CPC .............. *B64C 25/50* (2013.01); *B64C 25/34* (2013.01); *F15B 15/065* (2013.01); *F15B 15/1428* (2013.01); *F15B 15/1452* (2013.01); *F15B 15/1447* (2013.01)

(58) Field of Classification Search
CPC ....... B64C 25/34; B64C 25/50; B64C 25/505; F15B 15/065; F15B 15/1428; F15B 15/1447; F15B 15/1452
(Continued)

(56) References Cited

U.S. PATENT DOCUMENTS 2,712,422 A * 7/1955 Gerwig .................. B64C 25/50
180/431
3,001,741 A * 9/1961 Rumsey ................ B64C 25/505
244/50
(Continued)

FOREIGN PATENT DOCUMENTS

| DE | 42 253 A1 | 3/1976 |
| EP | 0 119 923 A1 | 9/1984 |
| FR | 2 568 218 A1 | 1/1986 |

OTHER PUBLICATIONS

International Search Report of PCT/EP2015/050113 dated Mar. 16, 2015.

*Primary Examiner* — Richard R. Green
*Assistant Examiner* — Brady W Frazier
(74) *Attorney, Agent, or Firm* — Sughrue Mion, PLLC

(57) ABSTRACT

Aircraft landing gear (100) provided with a bottom portion (110) that is steerable by means of a steering actuator (1) comprising a toothed wheel (70) that is secured to the steerable bottom portion (110) and that co-operates with a rack (20) that is movable in translation along an axial travel axis (X) and that has ends (21a, 21b) connected to pistons (30a, 30b) mounted to slide in respective cylinders (10a, 10b). Each connection between one of the pistons (30a, 30b) and the associated end of the rack (20) presents play (J) at least axially, and possibly also angular play (E), and at least one sealing gasket, referred to as an internal gasket (25), between the rack (20) and a piston (30a, 30b), the gasket (Continued)

being arranged to oppose movements of the rack (20) relative to the pistons (30*a*, 30*b*).

4 Claims, 2 Drawing Sheets

(58) Field of Classification Search
USPC .......................................... 244/103 R; 74/109
See application file for complete search history.

(56) References Cited

U.S. PATENT DOCUMENTS

| | | | | |
|---|---|---|---|---|
| 3,401,577 A * | 9/1968 | Partridge | ................ | B64C 25/50 |
| | | | | 244/50 |
| 3,788,159 A * | 1/1974 | Plant, II | .................. | B62D 3/12 |
| | | | | 74/422 |
| 4,610,411 A * | 9/1986 | Veaux | ..................... | B64C 25/50 |
| | | | | 180/428 |
| 4,669,364 A * | 6/1987 | Komatsu | ................. | B62D 5/22 |
| | | | | 92/128 |
| 5,213,175 A * | 5/1993 | Feindel | .................... | B62D 5/12 |
| | | | | 180/428 |
| 5,251,717 A * | 10/1993 | Klosterhaus | ............ | B62D 5/12 |
| | | | | 180/428 |
| 2004/0195036 A1* | 10/2004 | Borza | ..................... | B62D 5/12 |
| | | | | 180/417 |
| 2011/0215192 A1* | 9/2011 | Colantonio | ............ | B64C 25/34 |
| | | | | 244/50 |
| 2015/0000433 A1* | 1/2015 | Farcy | ..................... | F16H 19/04 |
| | | | | 74/30 |

\* cited by examiner

AIRCRAFT LANDING GEAR WITH ORIENTABLE LOWER PART

CROSS REFERENCE TO RELATED APPLICATIONS

This application is a National Stage of International Application No. PCT/EP2015/050113 filed Jan. 6, 2015, claiming priority based on French Patent Application No. 14 50283, filed Jan. 14, 2014, the contents of which are incorporated herein by reference in their entirety.

The invention relates to the general field of aircraft landing gear provided with a bottom portion that is steerable by means of a steering actuator, the actuator comprising a toothed wheel secured to the steerable bottom portion of the landing gear, with the toothed wheel co-operating with a rack that is movable in translation along an axial travel axis in order, with the assistance of the rack, to drive turning of the toothed wheel.

BACKGROUND OF THE INVENTION

Aircraft landing gear is known in which a bottom portion possesses a steering actuator to enable the wheel(s) carried by the landing gear to be steered. In general, the landing gear has a shaft that can be turned relative to a stationary portion of the landing gear that is connected to the airframe of the aircraft. The turnable shaft is connected to the wheel(s) of the landing gear and is secured to a toothed wheel. Turning the toothed wheel enables the turnable shaft to be steered together with the aircraft wheels to which it is connected. The toothed wheel co-operates with a rack that is guided in translation by pistons coupled to the ends of the rack. For this purpose, each of the pistons is slidably mounted in a cylinder that is associated therewith.

In summary, the wheel(s) of the landing gear is/are steered under the control of a steering actuator having pistons that guide a rack to move in translation, which rack drives a toothed wheel secured to the turnable shaft that is in turn connected to the wheel(s) of the landing gear.

By way of example, mention may be made of patent document FR 2 568 218, which describes nose landing gear provided with such a rack actuator.

It has been observed that the teeth of the toothed wheel and/or the teeth of the rack suffer from premature wear.

OBJECT OF THE INVENTION

An object of the invention is to propose aircraft landing gear provided with a steering actuator having a rack and a toothed wheel driven to turn by said rack, the landing gear making it possible, at least in certain conditions, to minimize the wear of the teeth of the toothed wheel and/or the teeth of the rack.

SUMMARY OF THE INVENTION

In order to achieve this object, the invention provides aircraft landing gear provided with a bottom portion that is steerable by means of a steering actuator comprising a toothed wheel that is secured to the steerable bottom portion and that co-operates with a rack that is movable in translation along an axial travel axis and that has ends connected to pistons mounted to slide in respective cylinders.

The landing gear of the invention is essentially characterized in that each connection between one of the pistons and the associated end of the rack presents play at least axially and at least one sealing gasket between the rack and a piston, the gasket being arranged to oppose movements of the rack relative to the pistons.

Surprisingly, we have observed that the wear of the teeth of the toothed wheel and of the teeth of the rack is due to the repeated impacts to which they are subjected each time there is a change in the steering direction of the toothed wheel. Still surprisingly, we have observed that these impacts are due in part to functional play that exists between the teeth of the rack and the teeth of the toothed wheel. This functional play is also known as backlash and it is necessary, e.g. in order to make the landing gear easier to assemble. Unfortunately, during certain taxiing maneuvers of the aircraft, the toothed wheel starts to oscillate about a position in which it is held by the rack. On each oscillation there is thus an impact between a tooth of the toothed wheel and a tooth of the rack. On each impact between teeth, stress is generated at the roots of the teeth and wear occurs on the flanks of the teeth.

By having axial play between the piston and the associated rack, with a sealing gasket arranged to oppose movements of the rack relative to the piston, it is possible to obtain friction on this or these gaskets. In other words, a fraction of the energy that would normally be dissipated during impacts between teeth is now dissipated by friction on the internal sealing gasket. This energy dissipation makes it possible to reduce the wear of the teeth of the toothed wheel and of the rack.

In a particular embodiment of the invention, each end of the rack is cylindrical in shape and is received in a cylindrical bore of the piston that is associated therewith so as to allow the rack to slide axially relative to each of the pistons.

In this particular embodiment, each piston can slide relative to the end of the rack carrying it along a sliding stroke that is preferably limited to said backlash.

In combination with the above particular embodiment, it is also possible to ensure that each of the connections between a piston and the rack presents a ball joint arranged to allow the piston to swivel relative to the rack. The term "swiveling" is used to mean that the swiveling movement of the piston relative to the rack presents a swivel angle about an axis of rotation that is perpendicular to the axial travel axis.

In this particular embodiment, the system is capable of accommodating geometrical defects that might exist between the piston and the associated cylinder, thereby facilitating sliding of the rack.

In combination with any of the above particular embodiments, it is also possible to ensure that each piston mounted to slide in a cylinder carries at least one external sealing gasket for providing sealing between the piston and the corresponding cylinder in which it slides.

In this particular embodiment, the system can create axial friction force not only at the connection between one end of the rack and the associated piston via the internal sealing gasket, but also at the connection between the same piston and the associated cylinder via the external sealing gasket.

In combination with the above particular embodiment, it is also possible to ensure that for each given piston, the internal sealing gasket and the external sealing gasket associated with the given piston are arranged so that during axial movements of the rack relative to the given piston along said axial travel direction, the internal sealing gasket generates an internal axial friction force opposing the axial movement of the rack relative to the given piston, and the external sealing gasket generates an external axial friction force opposing the movement of the given piston relative to the jacket in which it slides, the external axial friction force associated with the given piston being strictly greater than the internal axial friction force associated with the same given piston.

In this particular embodiment, when the toothed wheel pivots about its pivot axis, there is initially sliding of the rack along the axial travel direction and sliding of the rack in at least one of the pistons. Consequently, over a given travel stroke equal to said backlash, the rack can move without entraining the piston. The internal axial friction force, which is a function of the pressure on either side of the piston and which is associated with the movement of the rack relative to the piston, serves to reduce some of the impact energy between the teeth of the rack and the teeth of the toothed wheel. This dissipation leads to a reduction in the wear of the teeth.

In combination with the above particular embodiment, it is also possible to ensure that each given piston co-operates with the cylinder in which it slides to define a hydraulic chamber, and that the internal and external sealing gaskets associated with the given piston are arranged so that, within the limit of a predetermined pressure range, and regardless of the pressure applied in said hydraulic chamber defined by the given piston, the external axial friction force is always greater than the internal axial friction force, and preferably the external axial friction force is at least twice the internal friction force.

By means of this particular embodiment, it is ensured that within the limit of a predetermined operating pressure range for the chamber, which typically lies in the range 0.5 megapascals (MPa) to 21 MPa, and regardless of the pressure applied within the given chamber, the rack can move over a predetermined travel stroke that is greater than or equal to the assembly clearance (the abovementioned backlash), within the piston that remains stationary in the corresponding jacket.

BRIEF DESCRIPTION OF THE FIGURES

The invention can be better understood on reading the following description of particular, non-limiting embodiments, given with reference to the figures of the accompanying drawings, in which.

DETAILED DESCRIPTION OF THE INVENTION

Figure 1:
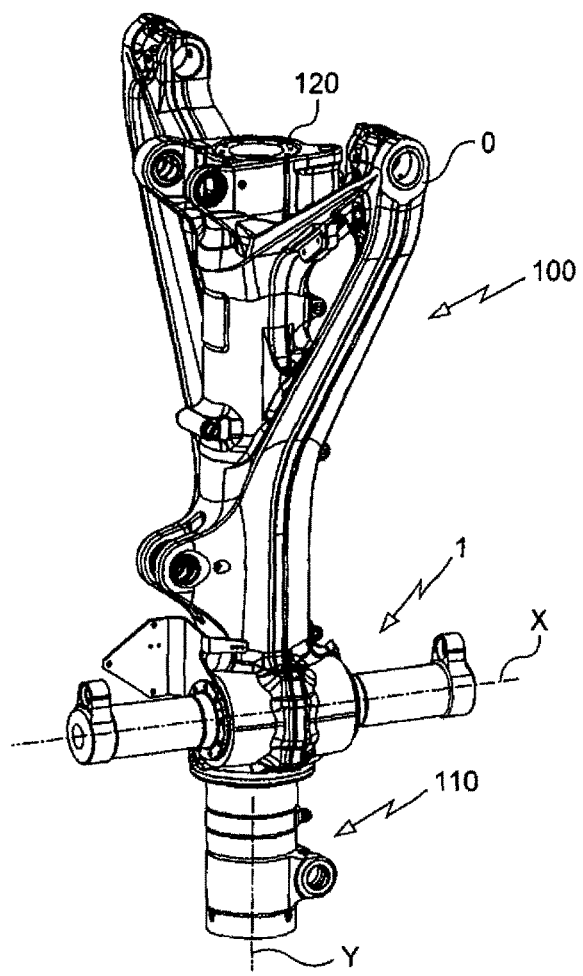
FIG. 1 is an overall view of aircraft landing gear of the invention having a steering actuator for steering wheels carried by the landing gear.

The invention relates to landing gear having a bottom portion 110 that is steerable relative to a top portion 0 of the landing gear. The top portion 0 is for connecting to the structure of the aircraft. The bottom portion 110 is arranged to carry at least one steerable wheel of the aircraft. The landing gear of the invention includes a steering actuator 1 that is arranged to control steering of the landing gear relative to the top portion, this steering taking place about a steering axis Y that can be seen in FIGS. 1 and 2.

Figure 2:
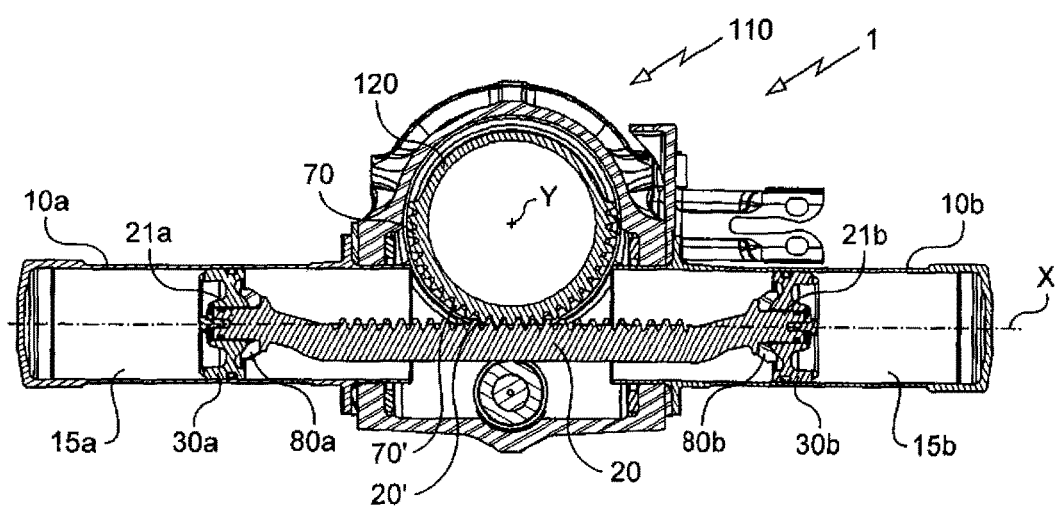
FIG. 2 shows the steering actuator of FIG. 1 seen on a section plane in which there extends a travel axis of the rack.

With reference to FIG. 2, and in accordance with the invention, the steering actuator 1 has a toothed wheel 70 secured to a turnable tube 120 forming part of the steerable bottom portion 110. This toothed wheel 70 co-operates with a rack 20 that is movable in translation along a travel axis X and that has ends 21a and 21b that are connected to respective pistons 30a and 30b. The travel axis X extends in a plane perpendicular to the steering axis Y. The actuator 1 has two cylinders 10a and 10b, and each of the pistons 30a, 30b is slidably mounted in a respective one of the cylinders 10a, 10b that is associated therewith. Each cylinder 10a, 10b presents an internal cylindrical surface 11 about an axis of revolution parallel to the axial travel axis X. The cylinders 10a, 10b and the pistons 30a, 30b form two hydraulic chambers 15a, 15b defining a double-acting hydraulic actuator enabling the rack 20 to be moved in one direction or the other along the axial travel axis X. In order to control movement of the rack 20 in a first axial travel direction along the axis X, and consequently steer the bottom portion 110 so as to pivot it in a first steering direction about the axis Y, it suffices to cause the pressure in the chamber 15a to be higher than the pressure in the chamber 15b with a pressure difference that is greater than a predetermined minimum threshold. In order to cause the rack to move in a second axial travel direction opposite to the first axial travel direction, and consequently steer the bottom portion 110 so as to pivot in a second steering direction opposite to the first steering direction, it suffices to cause the pressure in the chamber 15b to be greater than that in the chamber 15a with a pressure difference that is greater than the predetermined minimum threshold. Ideally, when one chamber is raised to a higher pressure by using a circuit for feeding hydraulic fluid under high pressure, it is ensured that the other one of the chambers is connected to a return, i.e. it is connected to a return circuit for low pressure hydraulic fluid.

Thus, in "normal" operation, the movement in translation of the rack 20 is driven by the double-acting hydraulic actuator. Thus, as soon as it is desired for the turntable tube 120 to have a specific steering angle, the hydraulic actuator moves the rack 20 along the travel axis X to the desired position and, by means of its teeth 20' that mesh with the teeth 70' of the toothed wheel 70, it drives the turnable tube 120.

While the aircraft is taxiing, the turnable tube 120, which is connected to the steerable wheel(s) of the aircraft, is subjected to forces coming from the taxiing and that tend in alternation to swivel the toothed wheel 70 back and forth in the first steering direction and in the second steering direction. Given the functional clearance (backlash) that exists between the teeth 70' of the toothed wheel 70 and the teeth 20' of the rack 20, the toothed wheel 70 can move freely within the limit set by this functional clearance relative to the rack, and this can happen even if the rack 20 is held strictly stationary.

Each free swiveling movement of the toothed wheel 70 relative to the rack 20 is stopped when one of the teeth 70' of the toothed wheel 70 comes into contact against one of the teeth 20' of the rack. Each time the free swiveling movement of the toothed wheel 70 is stopped, there is an impact between the teeth 20', 70', which tends to subject the teeth to wear. The connection between the pistons 30a, 30b and the rack 20 proposed by the invention serves to reduce the energy produced by at least some of the impacts between the teeth of the rack 20 and the teeth of the toothed wheel 70, and thus to reduce wear of the teeth 20', 70'. To do this, each end 21a, 21b of the rack 20 is assembled to the corresponding piston 30a, 30b via a connection that allows for:

firstly axial travel play along the axis X between each piston 30a, 30b and the rack 20; and secondly friction associated with each axial movement between a piston 30a, 30b and the rack 20.

Thus, a fraction of the energy from impacts between teeth is dissipated by friction between the pistons 30a, 30b and the rack 20.

In order to provide such friction during sliding between a piston 30a, 30b and the corresponding end 21a, 21b of the rack 20, each connection between a piston and the rack includes an internal gasket 25 serving firstly to provide sealing between the piston and the end of the rack that carries it, and serving secondly to generate internal friction between the piston and the rack.

Figure 3:
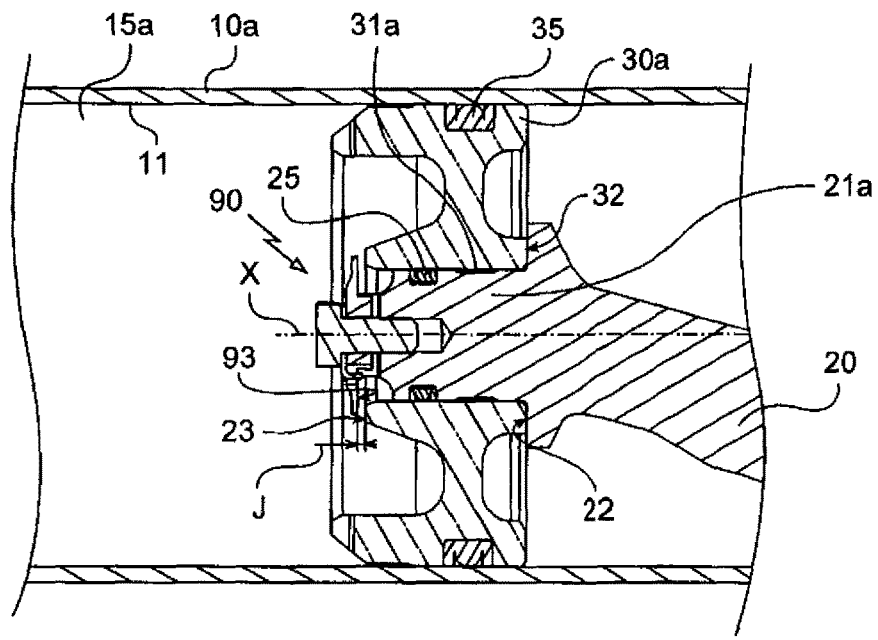
FIG. 3 is a section view of a first embodiment of the assembly between one of the ends of the rack and one of the pistons of the steering actuator of the invention.
Figure 4:
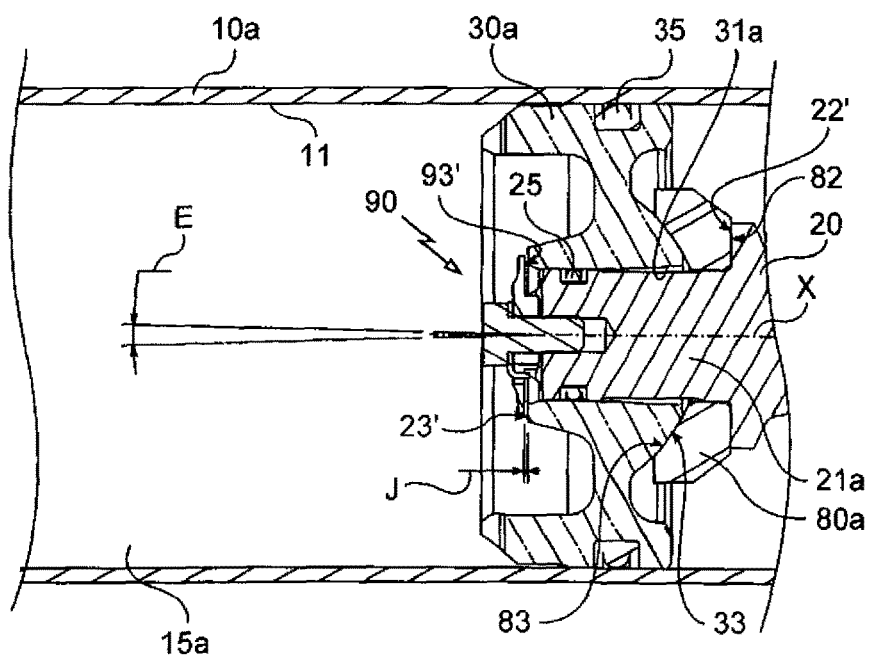
FIG. 4 is a section view of a second embodiment of the assembly between one of the ends of the rack and one of the pistons of the steering actuator of the invention.

With reference to FIGS. 2 and 3, the ends 21a, 21b of the rack 20 are cylindrical in shape and they are received in respective cylindrical bores 31a, 31b in the pistons 30a, 30b so as to allow the rack 20 to slide axially relative to each of the pistons 30a, 30b along the axial travel axis X. Nevertheless, this axial sliding is of stroke that is limited, on one side of the piston by abutment type contacts between a plane surface 32 of the piston 30a and a plane surface 22 of the rack 20, and on the other side of the piston 30a by contact of the same type between a plane surface 23 of the piston 30a and a plane surface 93 of a fastener assembly 90 fastened to the rack. These abutments 22 and 23 of the piston shown in FIG. 3, and 22', 23' of the piston shown in FIG. 4, are spaced apart so as to allow maximum sliding play J equal to the clearance between the teeth 20' of the rack 20 and the teeth 70' of the toothed wheel 70. The play J represents the maximum axial stroke of the piston 30a relative to the corresponding end 21a of the rack 20. The abutments 93 and 93' of the fastener assemblies 90, visible in FIGS. 3 and 4, are designed to enable the pistons 30a and 30b to be connected to the rack so as to form a rack-and-piston assembly. It should be observed that each jacket 10a, 10b presents an internal axial abutment limiting axial movement of the assembly of the rack with the pistons 30a and 30b in the jacket. These axial abutments that are internal to the jacket are arranged so that in the event of contact between an axial abutment and a piston 30a, 30b of the assembly of the rack and the pistons, this axial abutment bears against the piston so as to force it to engage on the corresponding end 21a, 21b of the rack 20. Thus, the pistons are not subjected to large tear-off forces, thereby preserving the fastener assemblies 90. Between each piston 30a, 30b and the internal cylindrical surface 11 of the associated cylinder 10a, 10b, there is a sealing gasket, referred to as an "outer" sealing gasket 35 that serves to seal the chamber 15a. Naturally, this outer sealing gasket 35 generates an axial friction force that is external to the piston due to the contact between the gasket 35 and the internal cylindrical surface 11 of the associated cylinder 10a, 10b.

In the same manner, between each end 21a, 21b of the rack 20 and the cylindrical bore 31a, 31b in the associated piston 30a, 30b, there is an internal sealing gasket 25 that provides sealing for the connection between each of the ends 21a, 21b of the rack 20 and the associated pistons 30a, 30b. Naturally, this internal sealing gasket 25 also generates an axial friction force that is internal due to the contact between the internal gasket 25 and the surface of the cylindrical bore 31 in the piston 30.

The internal and external gaskets 25, 35 associated with each given piston 30a, 30b, are arranged so that the internal friction forces are always less than the external friction forces. It is as a result of this difference between the internal and external friction forces that, on movement of the rack, and within the limit set by clearance between the teeth, the piston can remain stationary relative to the cylinder 10a, 10b in which it is located while the rack 20 is sliding in the piston. Since the internal diameters are smaller than the external diameters, the internal friction forces are smaller than the external friction forces and the rack can thus slide relative to the piston in order to limit the energy from impacts between the teeth 20', 70', and thereby limit wear of these teeth.

This difference between the external axial friction force and the internal axial friction force to which each given piston is subjected is due mainly to the nature of the gaskets and to the fact that the diameter of the external annular sealing gasket 35 is greater than the diameter of the internal annular sealing gasket 25. It should be added that the actuator is arranged in such a manner that regardless of the pressure applied within the chamber 15a, 15b, the external axial friction forces are always greater than the internal axial friction forces.

This difference between the two axial friction forces enables the rack 20 to move along the axial travel axis X before at least one of the pistons 30a, 30b and thus to move in translation independently of and inside one or both of said pistons 30a, 30b. Thus, when the toothed wheel 70 drives the rack 20, the rack moves along the axial travel axis X and at least one of its ends 21a, 21b slides inside at least one cylindrical bore 31a, 31b of a piston 30a, 30b. The internal axial friction force caused by the internal sealing gasket 25 during this axial movement then dissipates a fraction of the energy that would normally be dissipated during impacts between different teeth. This controlled dissipation of energy serves to reduce the wear of the teeth of the toothed wheel and of the rack by reducing the harmful effect of backlash in this particular mode of operation.

With reference to FIGS. 2 and 4, there can be seen an alternative embodiment of the connection between the piston 30a, 30b and the corresponding end 21a, 21b of the rack relative to which the piston 30a, 30b is mounted to slide along the axial travel direction X. This embodiment reproduces all of the characteristics of the embodiment described with reference to FIG. 3, but it further includes means for enabling each piston 30a, 30b not only to slide relative to the rack 20 along the axial travel direction X, but also to swivel relative to the end of the rack to which the piston is assembled. Each piston can swivel relative to the rack through a swivel angle that is greater than one degree of angle about at least one swivel axis perpendicular to the axial travel axis X. Such swiveling may be achieved by the presence of a ball joint 80a, 80b, or "ball part", at each end of the rack and forming part of the connection between the end 21a of the rack 20 and the corresponding piston 30a. The rack has a toothed zone extending between two annular plane surfaces 22' of the rack. Each end of the rack 20 penetrates through a complementary recess formed in the corresponding ball joint 80a, 80b. This ball joint 80a, 80b presents an annular plane surface 82 that comes into abutment against the corresponding annular plane surface 22' of the rack. Thus, each annular plane surface 22' opposes movement of the ball joint 80a, 80b towards the toothed zone of the rack. Each ball part 80a, 80b presents a spherical surface 83 that co-operates with a complementary spherical surface 33 formed on the corresponding piston 30. The spherical surface 83 of the ball joint is preferably concave towards the piston against which it comes to bear so as to encourage centering of the piston 30a against the ball joint 80a. Each bore in a piston enabling the rack 20 to pass through the piston presents a truncated cone with the base of the truncated cone pointing towards the ball joint 80*a* against which the piston comes to bear. Thus, the portion of the piston 30*a* that moves the most during swiveling is the portion of the piston 30*a* that is closest to the ball joint 80*a* and closest to the toothed zone of the rack. The fact that the portion of the piston that moves most during swiveling is the portion closest to the spherical surface 83 of the ball joint 80*a* makes it possible to take up the largest thrust forces of the piston against the ball joint 80*a*, which is itself in abutment against the annular plane surface 22'. This swiveling serves in particular to accommodate geometrical defects, such as a lack of axial alignment, that might exist between the piston 30*a*, 30*b* and the associated cylinder 10*a*, 10*b*, thereby facilitating sliding of the rack 20 and of the pistons 30*a*, 30*b* relative to the cylinders 10*a*, 10*b*.

This swiveling can easily be understood with reference to the swivel angle E visible in FIG. 4 that represents an angular stroke for the piston 30*a* relative to the rack 20. It should be observed that in the embodiment shown in FIG. 4, with the piston 30*a* sliding and swiveling relative to the rack 20, as in the embodiment shown in FIG. 3 with the piston 30*a* only sliding relative to the rack 20, the connection between the piston 30*a* and the corresponding end 21*a* of the rack is always symmetrical to the connection between the other piston 30*b* of the device and the other end 21*b* of the rack 20.

As mentioned above, each connection and/or assembly between a piston 30*a*, 30*b* and the corresponding end 21*a*, 21*b* of the rack 20 presents axial play J enabling axial sliding movement to take place between the piston and the corresponding end of the rack along an axial travel axis X of the rack. In each of the embodiments of FIGS. 3 and 4, to ensure that the landing gear 100 presents wear that is substantially identical on either side of each tooth 20' of the rack 20 and substantially identical on either side of each tooth 70' of the toothed wheel 70, it is ensured that the play J that exists between the end 21*a* of the rack 20 and the corresponding piston 30*a* is substantially identical to the play J that exists between the other end 21*b* of the rack 20 and the corresponding piston 30*b*. This play J is selected so as to be equal to or greater than the assembly clearance or backlash between the teeth 20', 70'. Thus, whatever the direction of sliding of the rack 20 relative to the cylinders 10*a*, 10*b*, there is always at least one of the pistons 30*a*, 30*b* that is capable of generating a friction force between the piston and the rack. This braking reduces the intensity of impacts between the teeth 20' of the rack and the teeth 70' of the toothed wheel. Because of this reduction in the impacts between teeth 20', 70', it is found that the invention makes it possible to reduce the wear of the teeth on the rack and on the toothed wheel that results, while the aircraft is taxiing, from repeated changes in the direction of rotation of the toothed wheel 70.

In the embodiment of FIG. 4, in addition to the axial play J, the presence of swiveling play through a swivel angle E serves to generate friction by swiveling during movement of the rack. This swiveling play, also helps reduce the wear on the teeth, although to a smaller extent than the axial play.

The invention claimed is:

1. An aircraft landing gear (100) provided with a bottom portion (110) that is steerable by means of a steering actuator (1) comprising a toothed wheel (70) that is secured to the steerable bottom portion (110) and that co-operates with a rack (20) that is movable in translation along an axial travel axis (X) and that has ends (21*a*, 21*b*) connected to pistons (30*a*, 30*b*) mounted to slide in respective cylinders (10*a*, 10*b*), the landing gear being characterized in that each connection between one of the pistons (30*a*, 30*b*) and the associated end of the rack (20) presents play (J) at least axially and at least one sealing gasket, referred to as an internal gasket (25), between the rack (20) and a piston (30*a*, 30*b*), the gasket being arranged to oppose movements of the rack (20) relative to the pistons (30*a*, 30*b*), wherein each end (21*a*, 21*b*) of the rack (20) is cylindrical in shape and is received in a cylindrical bore (31*a*) of the piston (30*a*, 30*b*) that is associated therewith so as to allow the rack (20) to slide axially relative to each of the pistons (30*a*, 30*b*) and wherein each of the connections between a piston (30*a*, 30*b*) and the rack (20) presents a ball joint (80*a*, 80*b*) with a spherical surface (83) that co-operates with a complementary spherical surface (33) formed on the piston (30) to allow the piston (30*a*, 30*b*) to swivel relative to the rack (20), said spherical surface (83) of the ball joint being concave towards the piston against which it comes to bear so as to encourage centering of the piston (30*a*) against the ball joint (80*a*).

2. The aircraft landing gear (100) according to claim 1, wherein each piston (30*a*, 30*b*) mounted to slide in a cylinder (10*a*, 10*b*) carries at least one external sealing gasket (35) for providing sealing between the piston (30*a*, 30*b*) and the corresponding cylinder (10*a*, 10*b*) in which it slides.

3. The aircraft landing gear (100) according to claim 2, wherein, for each given piston, the internal sealing gasket (25) and the external sealing gasket (35) associated with the given piston are arranged so that during axial movements of the rack (20) relative to the given piston along said axial travel direction (X), the internal sealing gasket (25) generates an internal axial friction force opposing the axial movement of the rack (20) relative to the given piston, and the external sealing gasket (35) generates an external axial friction force opposing the movement of the given piston relative to the cylinder (10*a*, 10*b*) in which it slides, the external axial friction force associated with the given piston (30*a*, 30*b*) being strictly greater than the internal axial friction force associated with the same given piston (30*a*, 30*b*).

4. The aircraft landing gear (100) according to claim 3, wherein each given piston (30*a*, 30*b*) co-operates with the cylinder (10*a*, 10*b*) in which it slides to define a hydraulic chamber (15*a*, 15*b*), and the internal and external sealing gaskets (25, 35) associated with the given piston (30*a*, 30*b*) are arranged so that, within the limit of a predetermined pressure range, and regardless of the pressure applied in said hydraulic chamber (15*a*, 15*b*) defined by the given piston (30*a*, 30*b*), the external axial friction force is always greater than the internal axial friction force.

* * * * *